US012565172B2

(12) United States Patent
Sheu et al.

(10) Patent No.: US 12,565,172 B2
(45) Date of Patent: Mar. 3, 2026

(54) METHOD FOR UNLOCKING VEHICLE BASED ON WINDOW GLASS, VEHICLE DEVICE AND VEHICLE EMPLOYING METHOD

(71) Applicants:Futaijing Precision Electronics (Yantai) Co., Ltd., Yantai (CN); HON HAI PRECISION INDUSTRY CO., LTD., New Taipei (TW)

(72) Inventors: Li Sheu, New Taipei (TW); Jian-Kai Zhang, New Taipei (TW); Chih-Chi Li, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 45 days.

(21) Appl. No.: 18/586,723

(22) Filed: Feb. 26, 2024

(65) Prior Publication Data

US 2025/0206259 A1    Jun. 26, 2025

(30) Foreign Application Priority Data

Dec. 22, 2023    (CN) .......................... 202311790725.0

(51) Int. Cl.
*B60R 25/20*        (2013.01)
(52) U.S. Cl.
CPC .................................... *B60R 25/20* (2013.01)

(58) Field of Classification Search
CPC ...................................................... B60R 25/20
USPC ...................................................... 340/425.5
See application file for complete search history.

(56)                References Cited

U.S. PATENT DOCUMENTS

2017/0300159 A1*  10/2017  Akiyoshi ............ G06F 3/04886
2017/0351370 A1*  12/2017  Oh .......................... G06F 21/31

FOREIGN PATENT DOCUMENTS

CN        105564376 A  *  5/2016  ........... B60R 25/245
CN        110341648        10/2019
CN        110920563        3/2020

* cited by examiner

*Primary Examiner* — Kam Wan Ma
(74) *Attorney, Agent, or Firm* — ScienBiziP, P.C.

(57)                ABSTRACT

A vehicle unlock method for unlocking a vehicle by pattern drawn on an objective glass includes: receiving a vehicle unlock request and enabling a pattern sensing function of the objective glass of the vehicle based on the vehicle unlock request; identifying a first touch operation of a user on the objective glass and obtaining vehicle unlock information according to an identified result of the first touch operation of the user; determining whether the vehicle unlock information matches with predetermined unlock information; and unlocking the vehicle in response to the vehicle unlock information matching with the predetermined unlock information. A vehicle device and a vehicle are also disclosed.

3 Claims, 5 Drawing Sheets

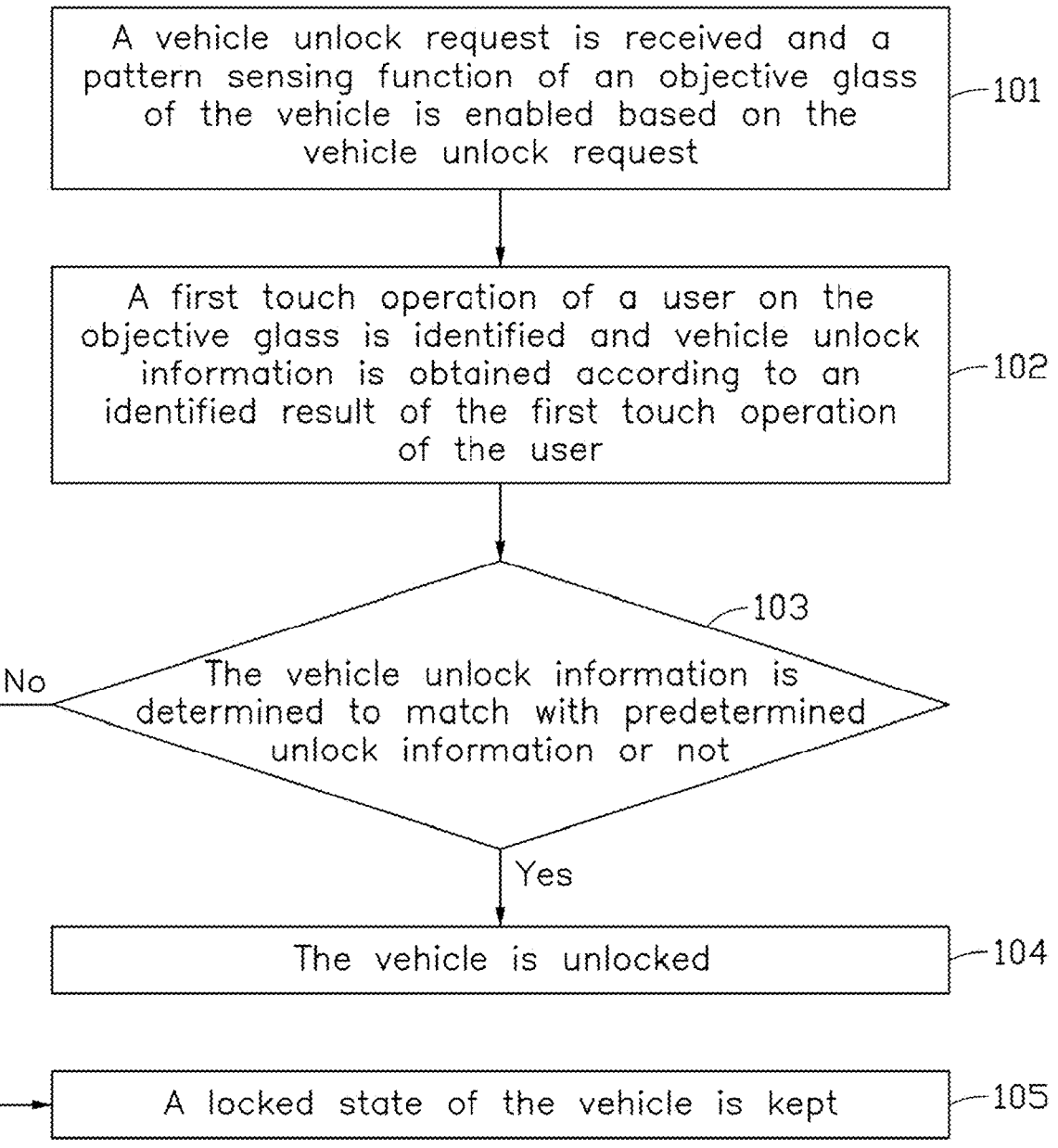

A vehicle unlock request is received and a pattern sensing function of an objective glass of the vehicle is enabled based on the vehicle unlock request ⟋101

A first touch operation of a user on the objective glass is identified and vehicle unlock information is obtained according to an identified result of the first touch operation of the user ⟋102

The vehicle unlock information is determined to match with predetermined unlock information or not ⟋103

No

Yes

The vehicle is unlocked ⟋104

A locked state of the vehicle is kept ⟋105

FIG. 1

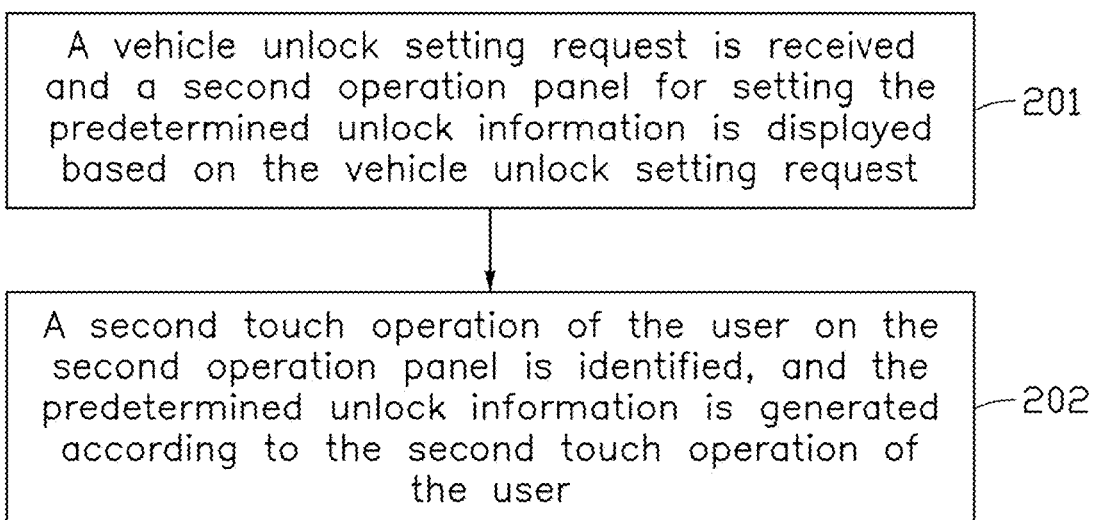

A vehicle unlock setting request is received and a second operation panel for setting the predetermined unlock information is displayed based on the vehicle unlock setting request — 201

A second touch operation of the user on the second operation panel is identified, and the predetermined unlock information is generated according to the second touch operation of the user — 202

FIG. 4

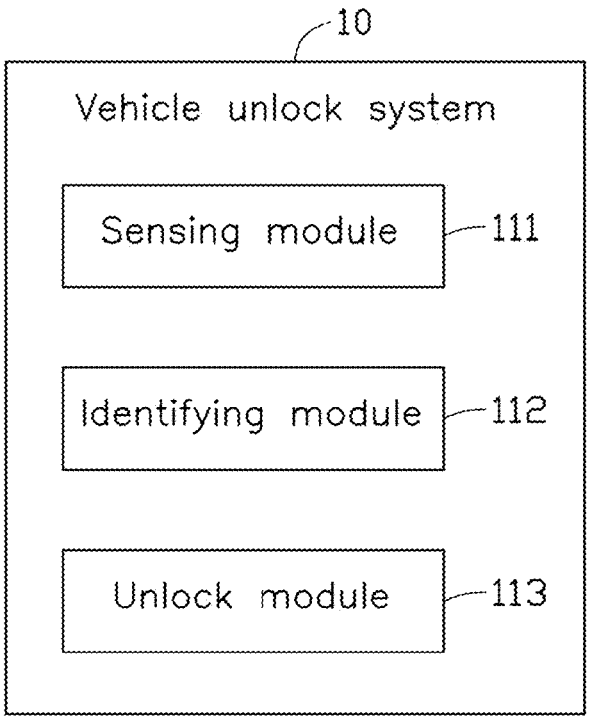

10

Vehicle unlock system

Sensing module — 111

Identifying module — 112

Unlock module — 113

METHOD FOR UNLOCKING VEHICLE BASED ON WINDOW GLASS, VEHICLE DEVICE AND VEHICLE EMPLOYING METHOD

TECHNICAL FIELD

The subject matter herein generally relates to vehicle unlock based on a window glass of a vehicle.

BACKGROUND

Vehicle door lock and engine lock are an important part of car security, and current vehicle door lock and engine lock are mainly unlocked by a smart key (wirelessly key).

However, a wireless frequency band of the smart key is fixed, and a wireless unlock code carried in the wireless frequency band of the smart key is also fixed. Although the smart key is convenient to use, the wireless unlock code of the smart key is relatively easy to crack, so, potential safety hazards are existed. If a user of a vehicle forgets to carry the smart key, the vehicle cannot be opened, resulting in a poor user experience.

BRIEF DESCRIPTION OF THE DRAWINGS

Implementations of the present disclosure will now be described, by way of embodiments, with reference to the attached figures.

FIG. 1 is a flowchart illustrating a vehicle unlock method according to an embodiment of the present disclosure.

FIG. 4 is a flowchart illustrating a vehicle unlock method according to another embodiment of the present disclosure.

FIG. 5 is a block diagram illustrating a vehicle unlock system of the vehicle according to an embodiment of the present disclosure.

DETAILED DESCRIPTION

Figure 2:
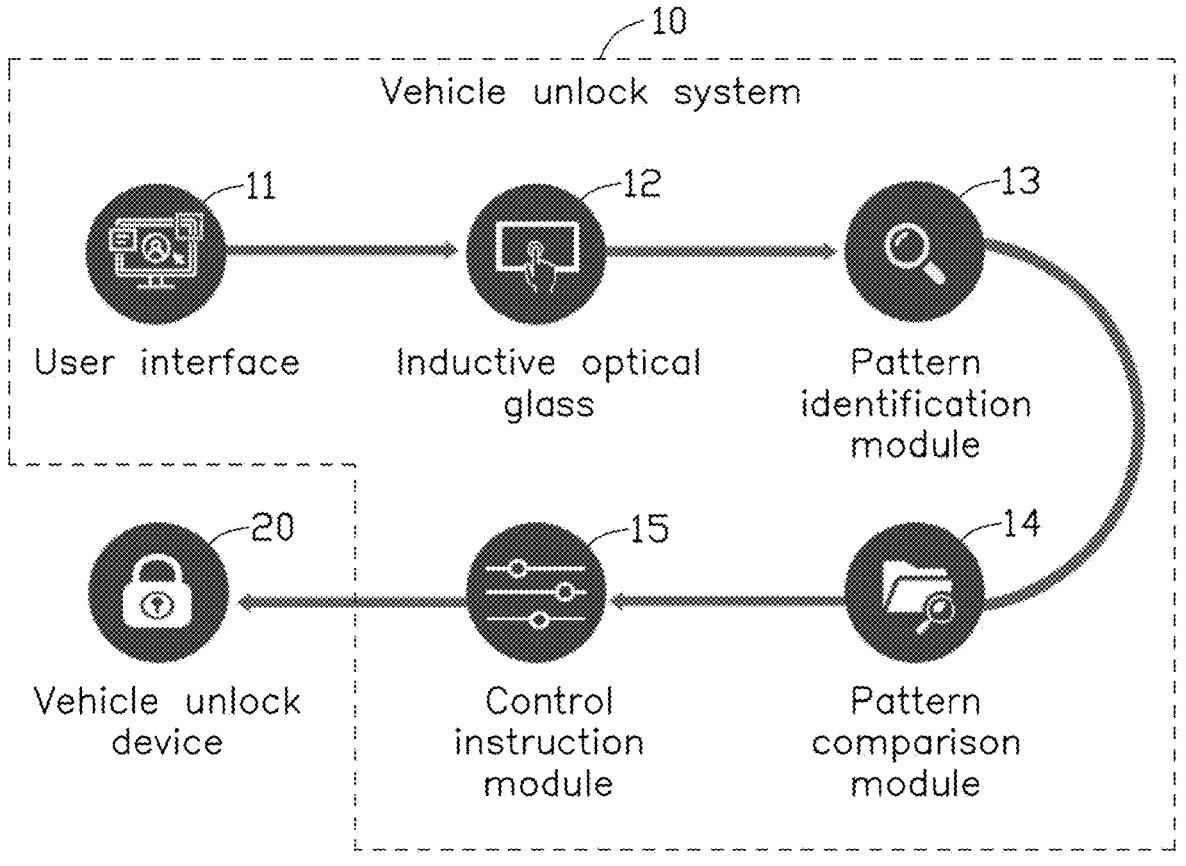
FIG. 2 is principle diagram illustrating a vehicle unlock function of a vehicle according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates one exemplary embodiment of a vehicle unlock method. The vehicle unlock method can be applied to a vehicle unlock system, the vehicle unlock system can be deployed in a vehicle. The flowchart presents an exemplary embodiment of the method. The exemplary method is provided by way of example, as there are a variety of ways to carry out the method. Each block shown in FIG. 1 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 101.

In block 101, a vehicle unlock request is received and a pattern sensing function of an objective glass of the vehicle is enabled based on the vehicle unlock request.

In one embodiment, the objective glass is a glass of the vehicle configured for sensing a touch operation. For example, the vehicle includes a plurality of window glasses (a front windshield, a rear windshield, side windows, and door windows), the objective glass is a window glass of the plurality of window glasses configured for sensing a touch operation.

In one embodiment, the vehicle may includes one or more objective glasses. For example, the objective glass may be a side window of a door window on a cockpit side.

In one embodiment, the objective glass may be an existing glass arranged on the vehicle, or an additional glass for sensing the touch operation, the additional glass may be arranged on the existing glass or a special area. The embodiments do not limit an installation position and a structure of the objective glass.

In one embodiment, a human body sensing device may be installed on the vehicle. When a human body is sensed within a preset distance of the vehicle, the vehicle unlock request is sent from the human body sensing device to the vehicle unlock system of the vehicle.

In one embodiment, a terminal sensing device may be installed on the vehicle. When a terminal device is sensed within a preset distance of the vehicle, the vehicle unlock request is sent from the terminal sensing device to the vehicle unlock system of the vehicle. For example, the terminal device may be a mobile phone or a smartwatch of the vehicle owner. The mobile phone or the smartwatch may pre-pair with the terminal sensing device.

In one embodiment, a user can may send an allowable unlock information to the vehicle unlock system through a terminal device (a mobile phone, a smartwatch, etc.), the vehicle unlock system enables the pattern sensing function of the objective glass of the vehicle after receiving the allowable unlock information. The terminal device may pre-pair with the vehicle unlock system.

In one embodiment, enable the pattern sensing function of the objective glass may includes: displaying a first operating panel for unlocking the vehicle on the objective glass. The embodiments do not limit a display type or a display style of the first operation panel. For example, the first operation panel may be a nine-square grid light spot, or a numeric keypad.

In block 102, a first touch operation of a user on the objective glass is identified and vehicle unlock information is obtained according to an identified result of the first touch operation of the user.

In one embodiment, when the first operating panel is displayed on the objective glass, the vehicle unlock system can identify pattern information drawn by the user on the first operation panel, convert the pattern information into data point information, and regard the data point information as the vehicle unlock information.

For example, the first operation panel may be displayed as the nine-square grid light spot, the vehicle unlock system obtains a pattern drawn by the user on the nine-square grid light spot, and converts the pattern into data point information.

For example, the first operation panel may be displayed as the numeric keypad, the vehicle unlock system obtains click positions clicked by the user on the numeric keypad, and converts the click positions into data point information.

In block 103, the vehicle unlock information is determined to match with predetermined unlock information or not.

In block 104, the vehicle is unlocked when the vehicle unlock information matches with the predetermined unlock information.

In block 105, a locked state of the vehicle is kept when the vehicle unlock information does not match with the predetermined unlock information.

In one embodiment, when the vehicle unlock information matches with the predetermined unlock information, the vehicle unlock system may generate and send an unlock command for unlocking the vehicle to a vehicle unlock device of the vehicle, the vehicle unlock device can unlock doors of the vehicle based on the unlock command. When the vehicle unlock information does not match with the predetermined unlock information, the vehicle unlock system may generate matching failure information, and the vehicle unlock device does not unlock the doors.

In one embodiment, when the vehicle unlock system receives the allowable unlock information form the terminal device, and determines the vehicle unlock information match with the predetermined unlock information, the user can further start the vehicle after unlocking the doors. For example, the user may go into the cockpit of the vehicle after unlocking the doors, and press the ignition switch to start the vehicle.

In one embodiment, the matching failure information may display on the first operation panel or paly as sound. After displaying or playing the matching failure information, the user can re-touch/re-click the first operation panel to unlock the vehicle.

In one embodiment, the matching failure information may be sound prompting information, text prompting information, etc. The embodiments do not limit types of the matching failure information.

In one embodiment, the vehicle unlock system may count the number of times that the matching failure information is generated in a first predetermined time period. When the number of times is greater than or equal to a predetermined value, the vehicle unlock system may disable the pattern sensing function of the objective glass in a second predetermined time period. In this way, multiple unlock operations of non-vehicle owners can be forbad in a time period, and improving the security of the vehicle. The predetermined value, the first predetermined time period, and the second predetermined time period can be defined according to a user requirement or a factory setting. For example, the predetermined value may be 3 times, the first predetermined time period may be 1 minute, the second predetermined time period may be 15 minutes.

In one embodiment, the vehicle unlock system may communicate with the terminal device of the vehicle owner. When the number of times is greater than or equal to the predetermined value, the vehicle unlock system may send alarm information to the terminal device of the vehicle owner, to improve the security of the vehicle.

Figure 3:
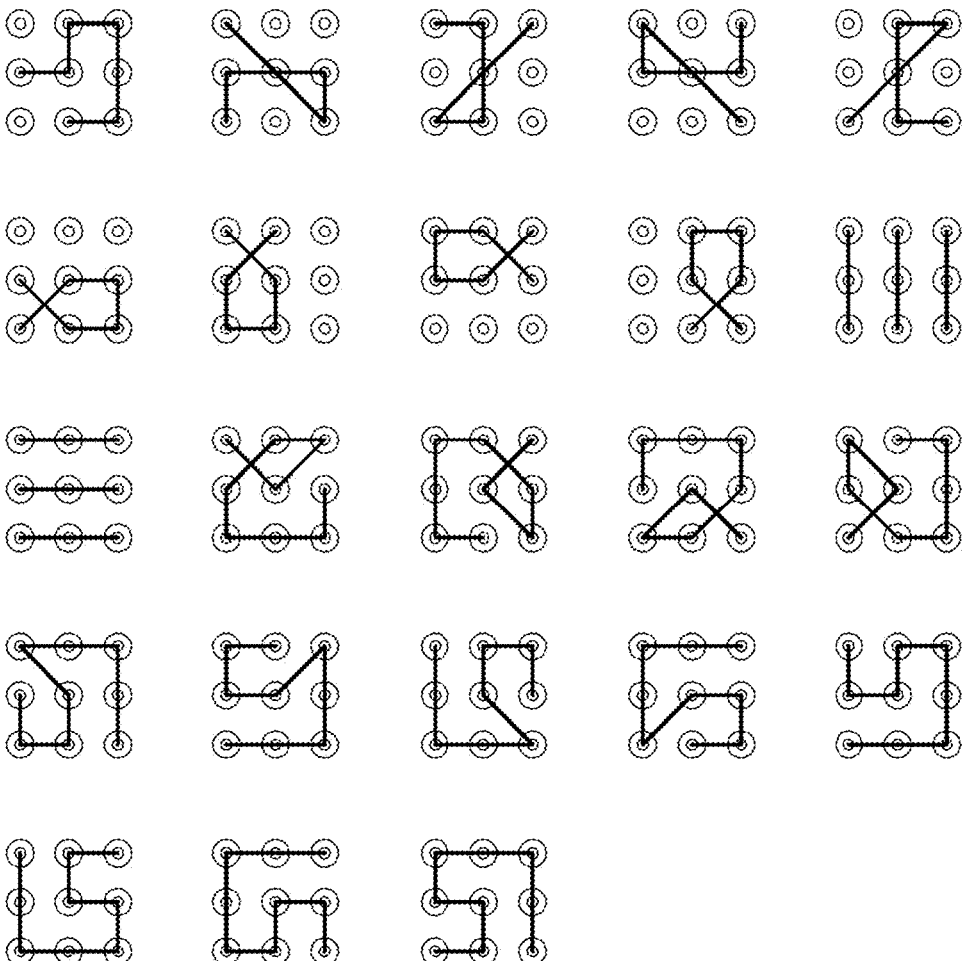
FIG. 3 is a pattern diagram illustrating a first operating panel of the vehicle according to an embodiment of the present disclosure.

Referring to FIGS. 2 and 3, show an unlock principle of the vehicle unlock method.

As shown in FIG. 2, the vehicle unlock system 10 may include a user interface 11, an inductive optical glass 12, a pattern identification module 13, a pattern comparison module 14, a control instruction module 15. The user interface 11 may include a window panel for drawing the pattern by the user and a control panel for setting an unlock pattern by the user.

In one embodiment, the window panel and the control panel may be the same panel.

The inductive optical glass 12 may be located under the window panel, the inductive optical glass 12 is configured to sense a pattern drawn by the user on the window panel. The inductive optical glass 12 may be a part of the objective glass, or the window panel may be a part of the objective glass.

The pattern identification module 13 converts signals received by touch sensors into a digital pattern. The touch sensors may be integrated into the inductive optical glass 12.

The pattern comparison module 14 compares the digital pattern with a predetermined unlock pattern, to obtain a comparison result (match or un-match). The control instruction module 15 sends an unlock command to the vehicle unlock device 20 when the digital pattern matches with the predetermined unlock pattern. After receiving the unlock command, the vehicle unlocking device 20 can unlock the vehicle, for example, unlock the doors of the vehicle.

In one embodiment, each module (the pattern identification module 13, the pattern comparison module 14, or the control instruction module 15) may include one or more software programs in the form of computerized codes stored in a data storage. The computerized codes can include instructions that can be executed by a processor to implement the above-function of each module. For example, the vehicle unlock system 10 may include a processor to implement the functions of the pattern identification module 13, the pattern comparison module 14, and the control instruction module 15.

Referring to FIG. 3, shows the first operation panel being the nine-square grid light spot, the user can draw different patterns on the nine-square grid light spot. For example, the user can set one of pattern shown in FIG. 3 as the predetermined unlock pattern.

By setting the objective glass for sensing a touch operation of a user, the vehicle unlock method can start the pattern sensing function of the objective glass after receiving a vehicle unlocking request, so that the user can perform a touch operation on the objective glass, the vehicle unlocking information can be obtained, and determine whether the vehicle unlocking data matches with the predetermined unlocking information, and unlock the vehicle when the vehicle unlocking information matches the predetermined unlocking information. The vehicle can be unlocked without a smart key, a convenience of vehicle unlocking and a user experience can be improved.

FIG. 4 illustrates one exemplary embodiment of a vehicle unlock method. The vehicle unlock method can be applied to a vehicle unlock system, the vehicle unlock system can be deployed in a vehicle. The flowchart presents an exemplary embodiment of the method. The exemplary method is provided by way of example, as there are a variety of ways to carry out the method. Each block shown in FIG. 4 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 201.

Comparing with FIG. 1, the vehicle unlock method may further include block 201 and block 202.

In block 201, a vehicle unlock setting request is received and a second operation panel for setting the predetermined unlock information is displayed based on the vehicle unlock setting request.

In one embodiment, the user may send a vehicle unlock setting request to the vehicle unlock system to set the predetermined unlock information. For example, the user can send the vehicle unlock setting request to the vehicle unlock system through a terminal device communicated with the vehicle, or through a function button of the vehicle.

In one embodiment, before resetting the predetermined unlock information, the vehicle unlock system may verify a previously unlock information set by the user, to improve a security of the vehicle unlock system.

In one embodiment, the second operation panel may be displayed by the objective glass, or displayed by a in-vehicle infotainment (IVI) system of the vehicle. The embodiments do not limit a display position of the second operation panel.

In block 202, a second touch operation of the user on the second operation panel is identified, and the predetermined unlock information is generated according to the second touch operation of the user.

In one embodiment, when the objective glass displays the second operation panel, the vehicle unlock system can identify pattern information drawn by the user on the second operation panel, convert the pattern information into data point information, and regarding the data point information as the predetermined unlock information.

For example, the first operation panel may be displayed as a nine-square grid light spot, the vehicle unlock system obtains a pattern drawn by the user on the nine-square grid light spot, and converts the pattern into data point information, the data point information can be regarded as the predetermined unlock information.

For example, the second operation panel may be displayed as a numeric keypad, the vehicle unlock system obtains click positions clicked by the user on the numeric keypad, and converts the click positions into data point information, the data point information can be regarded as the predetermined unlock information.

In one embodiment, before performing the block 201, the blocks 101~104 or blocks 101~103 and 105 can be performed.

By setting the objective glass for sensing a touch operation of a user, the vehicle unlock method can start the pattern sensing function of the objective glass after receiving a vehicle unlocking request, so that the user can perform a touch operation on the objective glass, the vehicle unlocking information can be obtained, and determine whether the vehicle unlocking data matches with the predetermined unlocking information, and unlock the vehicle when the vehicle unlocking information matches the predetermined unlocking information. The vehicle can be unlocked without a smart key, a convenience of vehicle unlocking and a user experience can be improved, and the predetermined unlocking information can be changed, users can customize the predetermined unlocking information, and the predetermined unlocking information can be changed at any time, and the predetermined unlocking information is not easy to crack, which can increase a security level of vehicle unlocking.

Referring to FIG. 5, the vehicle unlock system 10 may include a sensing module 111, an identifying module 112, and a unlock module 113. The sensing module 111 is configured to enable a pattern sensing function of an objective glass based on a vehicle unlock request. The identifying module 112 is configured to identify a first touch operation of a user on the objective glass to obtain vehicle unlock information, the objective glass is a glass of the vehicle configured for sensing touch operations. The unlock module 113 is configured to unlock the vehicle when the vehicle unlock information matches with the predetermined unlock information. The unlock module 113 is further configured to keep a locked state of the vehicle when the vehicle unlock information does not match with the predetermined unlock information.

In one embodiment, each module (the sensing module 111, the identifying module 112, or the unlock module 113) may include one or more software programs in the form of computerized codes stored in a data storage. The computerized codes can include instructions that can be executed by a processor to implement the above-function of each module. For example, the vehicle unlock system 10 may include a processor to implement the functions of the sensing module 111, the identifying module 112, and the unlock module 113.

Figure 6:
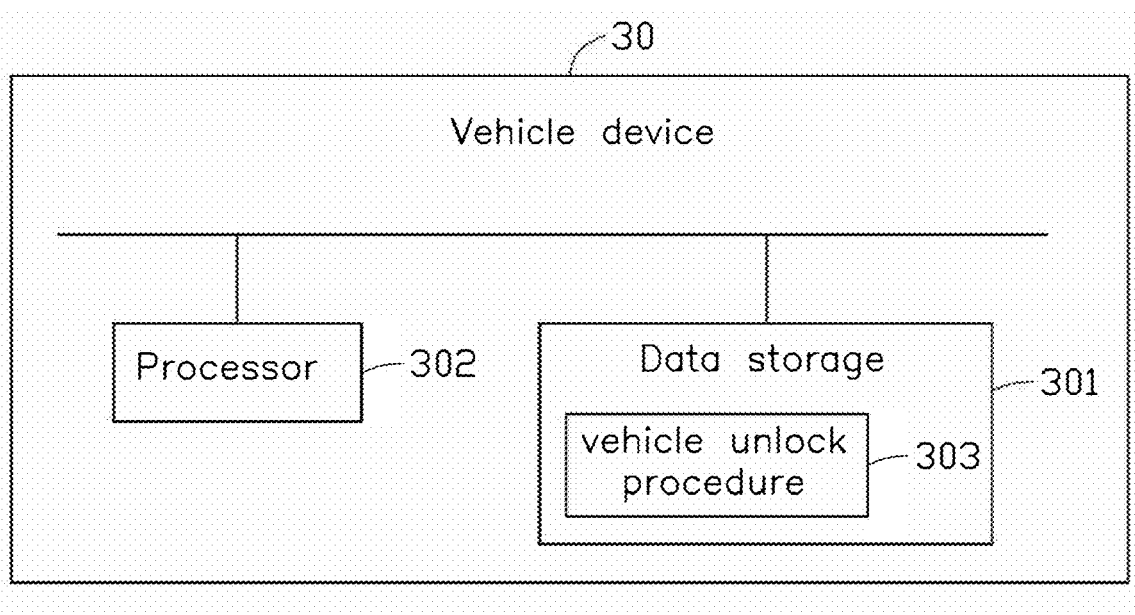
FIG. 6 is a block diagram illustrating a vehicle device of the vehicle according to an embodiment of the present disclosure.

Referring to FIG. 6, a vehicle device 30 may include at least one data storage 301, at least one processor 302, and a vehicle unlock procedure 303. The vehicle device 30 can be set in a vehicle.

In one embodiment, the data storage 301 can be set in the vehicle device 30, or can be a separate external memory card, such as an SM card (Smart Media Card), an SD card (Secure Digital Card), or the like. The data storage 301 can include various types of non-transitory computer-readable storage mediums. For example, the data storage 301 can be an internal storage system, such as a flash memory, a random access memory (RAM) for the temporary storage of information, and/or a read-only memory (ROM) for permanent storage of information. The data storage 301 can also be an external storage system, such as a hard disk, a storage card, or a data storage medium. The processor 302 can be a central processing unit (CPU), a microprocessor, or other data processor chip that achieves the required functions.

In one embodiment, the vehicle unlock procedure 303 may include one or more software programs in the form of computerized codes stored in the data storage 301. The computerized codes can include instructions that can be executed by the processor 302 to implement the above-mentioned of vehicle unlock method.

In other embodiments, comparing with FIG. 6, the vehicle device 30 can include more or less elements, for example, the vehicle device 30 can further include communication elements, buses elements, display panels.

Figure 7:
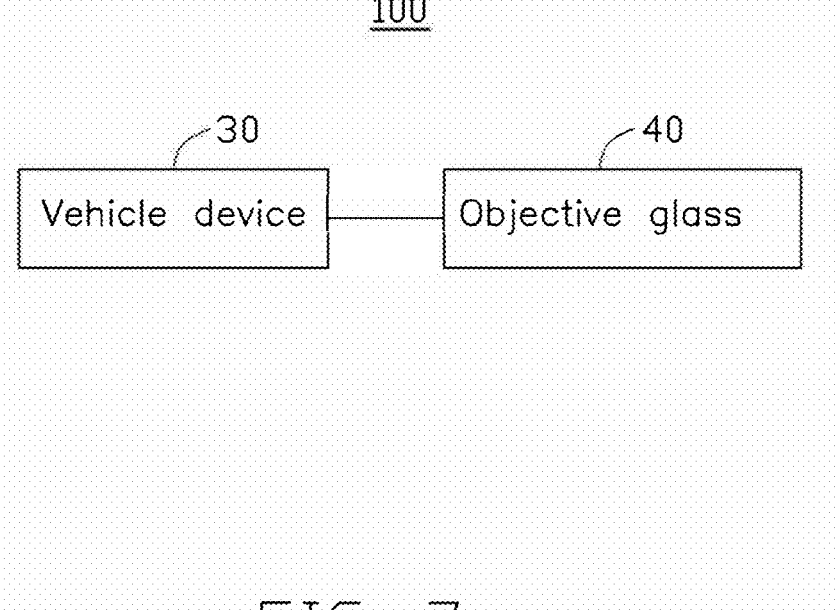
FIG. 7 is a block diagram illustrating the vehicle according to an embodiment of the present disclosure

Referring to FIG. 7, a vehicle 100 may include the vehicle device 30 and the objective glass 40. The objective glass 40 may be a window glass of the plurality of window glasses for sensing touch operations. The vehicle device 30 may receive a vehicle unlock request, enable a pattern sensing function of the objective glass based on the vehicle unlock request, identify a first touch operation of a user on the objective glass and obtain vehicle unlock information according to an identified result of the first touch operation of the user, determine whether the vehicle unlock information matches with predetermined unlock information, and unlock the vehicle in response to the vehicle unlock information matching with the predetermined unlock information.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A vehicle unlock method applied in a vehicle, the vehicle comprising a plurality of objective glasses, the method comprising:

receiving a vehicle unlock request and enabling a pattern sensing function of each of the plurality of objective glasses based on the vehicle unlock request, wherein each of the plurality of objective glasses is a glass of the vehicle configured for sensing a touch operation;

identifying a first touch operation of a user on an objective glass of the plurality of objective glasses and obtaining vehicle unlock information according to an identified result of the first touch operation of the user;

determining whether the vehicle unlock information matches with predetermined unlock information;

generating matching failure information in response to the vehicle unlock information unmatching with the predetermined unlock information;

detecting a number of times that the matching failure information is generated; and disabling the pattern sensing function of the objective glass in a predetermined time period in response to the number of times being greater than a predetermined value;

wherein receiving the vehicle unlock request and enabling the pattern sensing function of each of the plurality of objective glasses based on the vehicle unlock request further comprises:

enabling the pattern sensing function of each of the plurality of objective glasses in response to the vehicle receiving allowable unlock information, wherein the allowable unlock information is sent from a terminal device of the user, and a communication connection is established between the terminal device and the vehicle.

2. A vehicle device comprising:

at least one processor; and a data storage storing one or more programs which when executed by the at least one processor, cause the at least one processor configured to:

receive a vehicle unlock request and enable a pattern sensing function of a plurality of objective glasses of a vehicle based on the vehicle unlock request, wherein each of the plurality of objective glasses is a glass of the vehicle configured for sensing a touch operation;

identify a first touch operation of a user on an objective glass of the plurality of objective glasses and obtain vehicle unlock information according to an identified result of the first touch operation of the user;

determine whether the vehicle unlock information matches with predetermined unlock information;

generate matching failure information in response to the vehicle unlock information unmatching with the predetermined unlock information;

detect a number of times that the matching failure information is generated; and disable the pattern sensing function of the objective glass in a predetermined time period in response to the number of times being greater than a predetermined value;

wherein when the at least one processor receives the vehicle unlock request and enables the pattern sensing function of the plurality of objective glasses of the vehicle based on the vehicle unlock request, the at least one processor is further caused to:

enable the pattern sensing function of each of the plurality of objective glasses in response to the vehicle receiving allowable unlock information, the allowable unlock information is sent from a terminal device of the user, and a communication connection is established between the terminal device and the vehicle.

3. A vehicle comprising:

a plurality of objective glasses, each of the plurality of objective glasses configured for sensing touch operations; and a vehicle device, the vehicle device comprising:

at least one processor; and a data storage storing one or more programs which when executed by the at least one processor, cause the at least one processor configured to:

receive a vehicle unlock request and enable a pattern sensing function of each of the plurality of objective glasses based on the vehicle unlock request;

identify a first touch operation of a user on an objective glass of the plurality of objective glasses and obtain vehicle unlock information according to an identified result of the first touch operation of the user;

determine whether the vehicle unlock information matches with predetermined unlock information;

generate matching failure information in response to the vehicle unlock information unmatching with the predetermined unlock information;

detect a number of times that the matching failure information is generated; and disable the pattern sensing function of the objective glass in a predetermined time period in response to the number of times being greater than a predetermined value;

wherein when the at least one processor receives the vehicle unlock request and enables the pattern sensing function of each of the plurality of objective glasses based on the vehicle unlock request, the at least one processor is further configured to:

enable the pattern sensing function of each of the plurality of objective glasses in response to the vehicle receiving allowable unlock information, the allowable unlock information is sent from a terminal device of the user, and a communication connection is established between the terminal device and the vehicle.

* * * * *